United States Patent

[11] 3,548,142

| | | | |
|---|---|---|---|
| [72] | Inventor | Kurt H. Sennowitz | |
| | | Royal Oak, Mich. | |
| [21] | Appl. No. | 874,574 | |
| [22] | Filed | Nov. 6, 1969 | |
| | | Continuation-in-part of Ser. No. 699,443, Jan. 22, 1968, Pat. No. 3,524,036. | |
| [45] | Patented | Dec. 15, 1970 | |
| [73] | Assignee | Elox Inc. | |
| | | Troy, Mich. | |
| | | a corporation of Delaware | |

[54] GAP SHORT CIRCUIT CONTROL SYSTEM FOR ELECTRICAL DISCHARGE MACHINING APPARATUS
8 Claims, 2 Drawing Figs.

[52] U.S. Cl. ................................................. 219/69
[51] Int. Cl. ................................................. B23p 1/08
[50] Field of Search ........................................ 219/69C, 69P

[56] References Cited
UNITED STATES PATENTS
3,311,782  3/1967  Smith et al. ................ 219/69(C)X

*Primary Examiner*—R. F. Staubly
*Attorney*—Harry R. Dumont

ABSTRACT: A protective system for Electrical Discharge Machining for a power supply circuit including a periodically operated electronic output switch and a drive stage therefor. A network is connected between the output stage and the gap. Responsive to short circuiting of the gap, drive current is shunted by said network away from the output switch control electrode so that said switch is held off so long as the short circuit condition persists.

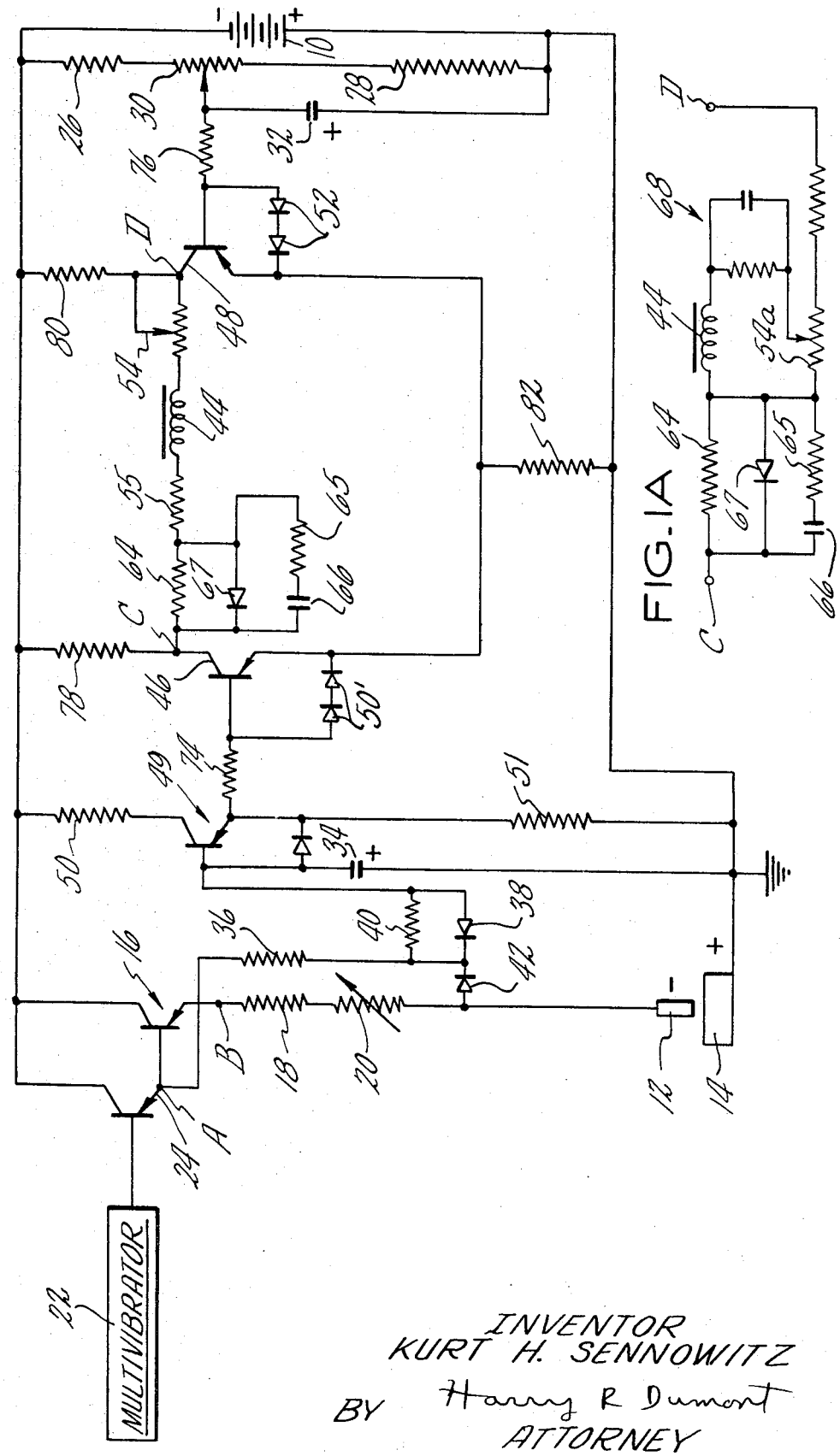

GAP SHORT CIRCUIT CONTROL SYSTEM FOR ELECTRICAL DISCHARGE MACHINING APPARATUS

CROSS REFERENCE TO RELATED APPLICATION

This application is a continuation-in-part of my copending application Ser. No. 699,443, filed on Jan. 22, 1968 now U.S. Pat. No. 3,524,036 for "Servocontrol Circuit for Electrical Discharge Machining Apparatus."

BACKGROUND OF THE INVENTION

The field to which my invention relates is that known as electrical discharge machining, hereinafter sometimes referred to as EDM, in which material is removed from an electrically conductive workpiece by the action of electrical gap discharges between a tool electrode and the workpiece. These discharges are provided through an electronic pulse generator in which an electronic output switch such as a semiconductor switching device is alternately triggered to turn it on and off and thus periodically connect a power source to the gap to cause machining power pulses across the machining gap. An electrode or workpiece servo feed system is employed to maintain an optimum gap spacing between electrode and workpiece as metal removal progresses. A dielectric coolant such as kerosene, or transformer oil is circulated continuously through the gap during machining operation. A servocontrol circuit is required which is capable of providing a relatively constant gap and over cut under both roughing and finishing conditions as the material is being removed from the workpiece. Allied with that problem is that arising from gap short circuit condition when eroded particles from electrode and workpiece become lodged in the machining gap. This condition can best be corrected by limiting the amount of current being passed to the gap so long as the condition persists. The combination of electrode backup action and concomitant current limiting gives best results.

SUMMARY OF THE INVENTION

My invention provides a current control system operable in an electronic switch operated EDM power supply. By "electronic" switch, I mean any electronic control device having three or more electrodes comprising at least two principal or power electrodes acting to control current flow in the power circuit, the conductivity between the principal electrodes being controlled by a control electrode within the switch whereby the conductivity of the power circuit is controlled statically or electrically without movement of mechanical elements within the switch. Included in this definition are electronic tubes, transistors and the like. The short circuit current control network is coupled between the drive signal source for the output switch control electrode and the gap so that drive current is conducted away from such control electrode to leave the output switch off. At the same time, the shunted drive signal is used to initiate an electrode withdrawal from the gap to further expedite clearing of the gap.

DESCRIPTION OF THE DRAWINGS

FIG. 1 is a combined schematic and diagrammatic showing of my invention. FIG. 1a shows a modification of a portion of that circuit.

DETAILED DESCRIPTION

The electrical discharge machining power supply includes a main machining power source 10. The machining power pulses are passed to the gap between tool electrode 12 and workpiece 14 through periodic operation of output transistor 16 which has its power electrodes, i.e., collector and emitter in series between power source 10 and the gap. Transistor 16 is normally biased off in the absence of triggering pulses being supplied to its base. Fixed resistor 18 and rheostat 20 are series connected between the emitter of transistor 16 and the gap to provide for selective control of cutting current being passed to the gap. A pulse generator embodied as multivibrator 22 is used to provide variable on-off time, variable frequency triggering pulses, i.e. drive signals through one or more drive stages 24 to its base to operate transistor 16. Several types of multivibrators suitable for use in this type of electrical discharge machining power supply are shown and described in Lobur U.S. Pat. No. 3,243,567 issued on Mar. 29, 1966 and entitled "Electrical Discharge Machining Apparatus." While my invention is shown in connection with a transistorized EDM power supply, it is not so limited but may be employed in any supply where an electronic switch, as I have defined it hereinabove, is connected between a DC power source and the machining gap and periodically triggered into operation.

My servocontrol circuit has its reference voltage derived from a resistor network connected in shunt with DC source 10 which source constitutes the main machining power supply. The reference voltage network includes fixed resistors 26, 28 connected in series with the variable resistor of potentiometer 30. Filter capacitor 32 is connected as shown. The control input for the differential amplifier is taken from the drive signal output from transistor 24 as shown. This signal is compared against an adjustable voltage set by potentiometer 30 to provide down-feed and backup of the servofeed means. Drive signal charges capacitor 34 through resistor 36 and diode 38 which is poled as shown. Diode 38 is further shunted by resistor 40. The connection of the sensing network is completed to the gap through diode 42 whereby drive signal may be passed into the gap.

The direction of electrode movement is controlled by the direction of current flow through an electrically energized element, in this case an electromagnetic servovalve coil 44 connected between the collectors of transistors 46 and 48 between points C and D. The full detail of the hydraulic motor and servovalve are not shown herein in the interest of simplifying this disclosure but a number of suitable electrohydraulic EDM servocontrol systems are shown and described in Webb U.S. Pat. No. 3,230,412 issued on Jan. 18, 1966, entitled "Servofeed Apparatus for Electrical Discharge Machining". Diodes 50' are connected across the base-emitter junction of transistor 46 to protect it from excess turn-off voltage. Similarly, diodes 52 are connected across the base-emitter junction of transistor 48. A third transistor 49 is coupled to transistor 46 in emitter follower arrangement with protective diode 47 included. Series resistors 50 and 51 are connected in series with the emitter-collector of transistor 49 with the magnitude of resistor 50 being substantially lower than that of resistor 51. The inclusion in the circuit of transistor 49 makes possible the use of a high impedance input to the servocontrol circuit. During low current cutting operation, stable servo operation is assured. Rheostat 54 has its variable resistor connected between the collector of transistor 48 at point D and the right-hand terminal of coil 44 to provide for adjustment for sensitivity of the servo operation. Rheostat 54 may optionally be connected as shown in FIG. 1a and identified by the numeral 54a. The placement of potentiometer 54a in shunt with coil 44 as shown by FIG. 1a is preferable during relatively slow feed operation. A parallel RC network is connected in series circuit with resistor 55 and point C. Included in the RC network are resistor 64, resistor 65 and capacitor 66. A fast backup diode 67 is connected with a polarity as shown. Resistor 65 is included to limit the discharge of capacitor 66. In FIG. 1a. potentiometer 54a is connected in shunt with control coil 44 through an RC network 68. It is the function of RC network 68 to keep the servo "alive" during slow feed operation of the circuit. Current limiting resistors 74 and 76 are connected in circuit with the respective bases of transistors 46, 48. Load resistors 78 and 80 are connected between the respective collectors of transistors 46 and 48 and the negative voltage terminal of DC source 10 while resistor 82 is coupled between the positive terminal of DC source 10 and the emitters of transistors 46, 48.

DESCRIPTION OF OPERATION

When the power supply and multivibrator are turned on, drive signals are passed from transistor 24 to control the operation of output transistor 16. Machining power pulses are provided across the gap with precisely controllable frequency and on-off time or duty factor. At the same time, the negative drive signal is passed through resistor 36 and diode 38 to store on the upper plate of capacitor 34. A portion of this drive signal will be passed to the gap through diode 42. The negative drive signal stored on capacitor 34 provides turn-on of transistor 49 and turn-on of transistor 46. Electron flow then occurs from the negative terminal of DC source 10 through resistor 78, the collector-emitter of transistor 46 and resistor 82 to the positive terminal of DC source 10. At the same time, electron flow occurs through resistor 80, rheostat 54, in a leftward or downfeed direction through coil 44, through resistors 55, 64 and through transistor 46. The electron flow in a leftward direction through coil 44 causes the electrode 12 to be advanced downwardly toward the work 14. During a shorted gap, the other transistor 48 will be turned on providing inter alia an electron flow through coil 44 in a rightward or up-feed direction to withdraw the electrode 12 and move it upwardly away from workpiece 14 to permit the short circuit condition to be cleared. It is also significant that during a short circuit condition the electrode is being withdrawn from the workpiece and at the same time, by reason of the sensing network used, namely that including resistor 36, diodes 42, 38 and capacitor 34, and its connection to the gap, the drive signal is being virtually all passed to plus gap terminal or ground during a shorted arc gap. This mode of operation furnishes both prompt and effective backup and gap current limiting at the same time. The gap current limiting function may, of course, be operated independent of the servocontrol system if another mode of feed operation is desired.

An additional feature of particular importance is that of the incorporation of the rheostat 54 network in series with control coil 44. This is important for stable servo action during high frequency cutting. For stable slow feed operation, potentiometer 54a is connected in series with RC network 68 across coil 44. During normal cutting, the hydraulic control coil 44 will pass current in one direction only and hold the gap constant according to the reference setting previously made on potentiometer 30. In the circuit of FIG. 1, if the gap should short circuit, capacitor 66 will discharge rapidly and provide fast ram backup for perhaps 0.01 to 0.10 inches. This assists greatly in cutting away particles which may have been accumulated in the gap, and in breaking up the short circuit condition. This provides highly effective pulsing of the gap during up or down feed and particularly improves deep hole cutting by clearing the shorted gap more quickly thus preventing the electrode from backing out all the way.

The power feed system described herein is capable of maintaining stable downfeed even during low current finishing operation with very narrow on-time pulses.

It will thus be seen that I have provided a new and improved gap short circuit current limiting system for electrical discharge machining. My sensing circuit is capable of providing the necessary limitation of gap current and, at the same time, capable of providing an output signal to a servofeed control means for electrode backup to alleviate the cause of the short circuit. The connection of the sensing network, including resistor 36 and diode 42, with its upper terminal connected at point A and its lower terminal connected to the proper polarity gap element, electrode 12, achieves this unique combined function.

I claim:

1. In an electrical discharge machining apparatus having an output electronic switch periodically operated by a drive signal source for providing machining power pulses from a power source across a dielectric coolant filled gap between an electrode and a workpiece, wherein the improvement comprises a gap short circuit current limiting system including a network coupled between the output from said drive signal source and said gap, said network operable to shunt said drive signal from said control electrode of said switch responsive to said short circuit condition of said gap whereby said output switch is held open to limit current to said gap and interrupt machining power pulses thereto during said condition.

2. The combination as set forth in claim 1 wherein said network comprises a series connected resistor and diode combination, said combination connected between said signal source and said gap, said diode of a polarity to pass current to said gap in said shorted condition of said gap.

3. The combination as set forth in claim 2 wherein one of the elements of said gap is of a negative polarity, said diode having its anode coupled to said element.

4. The combination as set forth in claim 3 wherein a variable resistor is coupled in series between said output switch and said gap for selectively setting gap current during machining, said network comprising a diode with its cathode connected to said series resistor and its anode connected to the negative element of said gap.

5. The combination as set forth in claim 1 wherein said output switch comprises a PNP transistor having its emitter connected to said gap for connecting said power source to said gap, said network including a diode having its cathode connected to the base of said transistor and to said drive signal output and having its anode connected to said gap for shunting drive current from said base during short circuit condition of said gap.

6. In an electrical discharge machining apparatus having an output electronic switch periodically turned-on by a drive signal source for providing machining power pulses from a power source across a dielectric coolant filled gap between an electrode and a workpiece, wherein the improvement comprises a short circuit condition current limiting and servofeed control system including a network coupled between the output from said drive signal source and said gap, said network including a diode connected in a polarity for shunting drive signal away from the control electrode of said output switch to interrupt gap current during said condition, a motive means, and a servofeed circuit, operatively connected to said motive means, said servofeed circuit coupled to said diode and responsive to said shunting of said drive signal for operating said motive means and increasing the spacing of said gap.

7. In an electrical discharge machining apparatus having a power supply and an electronic switch periodically operated by a drive signal source for providing machining power pulses across a dielectric coolant filled gap between an electrode and a workpiece, servo means for controlling the gap spacing including a reversible motive means, and an electrically energized element for controlling operation of said motive means, wherein the improvement comprises a sensing means operatively connected between said drive signal source and said gap for providing a first voltage signal representative of gap spacing, an adjustable reference voltage source for providing a second voltage signal, and means for providing a control signal to said element representative of the difference in magnitude between said first and second voltage signals, said sensing means comprising a diode connected between the drive signal input to said switch and said gap, and a series diode-capacitor network connected across the series combination of said first diode and said gap for storing said first voltage signal.

8. In an electrical discharge machining apparatus having a power supply and an electronic output switch periodically operated by a drive signal source for providing machining power pulses across a dielectric coolant filled gap between an electrode and a workpiece, servo means for controlling the gap spacing including a reversible motive means, and an electrically energized element for controlling operation of said motive means, wherein the improvement comprises a sensing means operatively connected between said drive signal source and said gap for providing a first voltage signal representative of gap spacing, an adjustable reference voltage source for providing a second voltage signal, and means for providing a control signal to said element representative of the difference in magnitude between said first and second voltage signals, said sensing means operable at the same time to shunt said drive signal from said electronic output switch during electrode backup due to gap short circuit.